United States Patent Office 3,595,850
Patented July 27, 1971

3,595,850
PROCESS FOR PRODUCTION OF POLYBUTADI-
ENES HAVING IMPROVED TEAR STRENGTH
Motowo Takayanagi, Fukuoka-ken, and Shotaro Sugiura, Teturo Matuura, Haruo Ueno, Fumio Tasaka, Minoru Kono, and Keiichi Tsuji, Yamaguchi-ken, Japan, assignors to Ube Industries Ltd., Yamaguchi-ken, Japan
No Drawing. Filed June 26, 1969, Ser. No. 836,962
Claims priority, application Japan, July 2, 1968, 43/45,615
Int. Cl. C08d 3/06
U.S. Cl. 260—94.3
8 Claims

ABSTRACT OF THE DISCLOSURE

A process for the production of polybutadiene, which comprises polymerising butadiene in an inert organic solvent in the presence of a trans-1,4-polymerisation catalyst of an amount such that a trans-1,4-structure accounts for 3–30% of the final polybutadiene, adding a cis-1,4-polymerisation catalyst to this polymerisation system, and polymerising the butadiene further in this system, the trans-1,4-polymerisation and cis-1,4-polymerisation times being adjusted so that the final polybutadiene has a trans-1,4-structure of 3–30% and a cis-1,4-structure of at least 70%.

---

This invention relates to a process for the production of polybutadienes having an improved tear strength. More particularly, it relates to a process for the production of polybutadienes having an improved tear strength by polymerising butadiene in the presence of a specific trans-1,4-polymerisation catalyst of an amount such that a trans-1,4-structure accounts for 3 to 30% of the final polybutadiene, and subsequently polymerising the butadiene in the same polymerisation system in the presence of a specific cis-1,4-polymerisation catalyst.

Heretofore, a high cis-1,4-polybutadiene having a high cis-1,4-structure content obtained by polymerising 1,3-butadiene has been produced in great quantities as a substitute of a natural rubber for production of tyres and other rubber products. There have been many reports regarding the increasing of a cis-1,4-structure content. That the physical properties of rubber products obtained from high cis-1,4-polybutadiene are superior to those of rubber products obtained from natural rubber, especially having a good impact resilience, generating less heat, and having an excellent abrasion resistance is one of the reasons for the high cis-1,4-polybutadiene being used in great quantities. However, high cis-1,4-polybutadiene have serious defects of a large cold flow and a very small tear strength of products obtained therefrom. Many proposals have already been made to reduce a cold flow, but on the other hand, no proposal has yet been made as regards a feasible method of increasing the tear strength of rubber products obtained from cis-1,4-polybutadiene.

A small tear strength of a vulcanized rubber product is considered to be one cause of a ready occurrence of chipping in tyre, and there has been a strong demand in the art for increasing the tear strength of rubber products from polybutadienes.

It was already proposed to form a mixture of cis-1,4-polybutadiene and trans-1,4-polybutadiene in a single stage by polymerising 1,3-butadiene in the co-presence of a catalyst capable of cis-1,4-polymerising butadiene and a catalyst capable of trans-1,4-polymerising butadiene (French Patent No. 1,439,294). According to this process, the notched impact strength, hardness and resistance to ageing of the obtained polybutadiene mixture may be improved, but the tear strength of the vulcanized product is not improved to a satisfactory degree.

An object of the present invention is to provide a polybutadiene composition which when made into a final rubber product exhibtis a remarkably improved tear strength, without any sacrifice of the excellent characteristics of cis-1,4-polybutadiene.

According to the invention, the foregoing object can be achieved by polymerising butadiene in an inert organic solvent for 5 minutes to one hour in the presence of a catalyst of an amount such that a trans-1,4-structure accounts for 3 to 30% of the final polybutadiene, said catalyst being a combination catalyst consisting of (a) a vanadium compound, and
 (c) a member selected from the group consisting of
   (i) compounds expressed by the general formula $$AlR_nX_{3-n} \qquad (1)$$

wherein R is an alkyl group or phenyl group, X is a halogen atom, and $n$ is 2 or 1.5,
   (ii) combinations of Lewis acids and compounds expressed by the general formula $$AlR_3 \qquad (2)$$

wherein R is an alkyl group or phenyl group, and,
   (iii) combinations of Lewis bases and compounds expressed by the general formula $$AlRX_2 \qquad (3)$$

wherein R is an alkyl group or phenyl group, and X is a halogen atom, thereafter, adding a cis-1,4-polymerisation catalyst and polymerising butadiene further in this polymerisation system, said cis-1,4-polymerisation catalyst being selected from the group consisting of (A) a catalyst consisting of
 (a') metallic cobalt, a material formed by electrochemically depositing metallic cobalt on the powder of metallic zinc, or a cobalt compound and
 (b') (i) a compound expressed by the general formula $$AlR_nX_{3-n} \qquad (1)$$

wherein R is an alkyl group or phenyl group, X is a halogen atom, and $n$ is 2 or 1.5,
   (ii) a combination of Lewis acid and a compound expressed by the general formula $$AlR_3 \qquad (2)$$

wherein R is an alkyl group or phenyl group, or
   (iii) a combination of a Lewis base and a compound expressed by the general formula $$AlR_mX_{3-m} \qquad (3)$$

wherein R is an alkyl group or phenyl group, X is a halogen atom, $m$ is 1 or 1.5,
(B) a catalyst obtained from a cobalt halide, metallic aluminium and a Lewis acid, and
(C) a catalyst obtained from metallic cobalt, mercuric chloride, water and a dialkyl aluminium monochloride, and thereafter, recovering a polybutadiene containing a trans-1,4 structure of 3 to 30% and a cis-1,4 structure of at least 70%.

The vanadium compounds usable in the invention as a component of the trans-1,4-polymerisation catalyst, when used together wtih organo-aluminium compounds to polymerise butadiene in an organic solvent, give trans-1,4-polybutadiene having a trans-1,4 structure of at least 96%, preferably at least 98%. Such vanadium compounds include halides, preferably chloride, of vanadium such as vanadium trichloride and vanadium tetrachloride, oxyhalides, preferably oxychloride, or vanadium such as vanadium oxytrichloride, organic complex salts of vanadium such as vanadium complex salts of β-diketones or β-ketonic acid esters, for instance, vanadium (III) trisacetylacetonate, vanadyl-bis- or trisacetylacetonate, vanadium (III) tris-acetoacetic acid ethyl ester, vanadyl-bis- or tris-acetoacetic acid ethyl ester, etc., and organic acid salts of vanadium such as vanadium salts of aromatic carboxylic acids or aliphatic carboxylic acids having at least 6 carbon atoms which are soluble in an inert organic solvent, the examples being vanadium octoate, vanadium naphthenate and vanadium benzoate.

As the organo-aluminium compounds of Formula 1 in which 2 or 1.5 organic radicals are attached to the aluminium atom, diethyl aluminium monochloride, diisobutylaluminium monochloride, ethylaluminium sesquichloride, and the like can be employed.

The organo-aluminium compounds of Formula 2 in which three organic radicals are bonded to the aluminium atom include triethylaluminium, triisobutylaluminium, and diethylphenyl aluminium. These organo-aluminium compounds are used in combination with Lewis acids such as aluminium trichloride and boron trifluoride.

Examples of the organo-aluminium compounds of Formula 3 are monoethylaluminium dichloride, and monoisobutylaluminium dichloride. These dihalides are used in combination with Lewis bases such as pyridine and aniline.

It is preferable that in the general Formulae 1, 2 and 3 representing the organo-aluminium compounds, R should be an alkyl group having 2 to 6 carbon atoms, and X, a chlorine atom.

The trans-1,4-polymerisation catalyst according to the invention is used in an amount such that the final polybutadiene contains a trans-1,4 structure of 3 to 30%, preferably 5 to 20%. The specific amount of the catalyst differs according to the kind and combination of the catalyst and the polymerisation conditions. Generally, at least 0.5 m-mol, preferably at least 1 m-mol, of the vanadium compound and at least 0.5 m-mol, preferably at least 1 m-mol, of the organo-aluminium compound are used, both per mol of the butadiene. The molar ratio of the organo-aluminium compound to the vanadium compound (in terms of Al/V) should preferably be in the range of 1 to 600, preferably 20 to 500. When the third component of the catalyst is used, its amount is preferably not more than 5 mols per mol of the organo-aluminium compound in the case of the Lewis acids, and not more than 0.5 mol per mol of the organo-aluminium compound in the case of the Lewis bases.

According to the invention, butadiene is polymerised in an inert organic solvent for about 5 minutes to one hour, preferably 5 to 30 minutes, in the presence of the above-mentioned trans-1,4-polymerisation catalyst. At this time, it is of particular importance to effect the trans-1,4-polymerisation of butadiene within the above-specified time. If the trans-1,4-polymerisation is effected for a considerably longer time than one hour, the obtained polybutadiene, when made into a rubber product, has a lowered tear strength, and on the other hand, if the polymerisation time is shorter than 5 minutes, the quality of the obtained polybutadiene tends to become irregular.

The inert organic solvent used in the invention is not particularly restricted so long as it is capable of dissolving the formed trans-1,4-polybutadiene and the catalyst, but the use of aromatic hydrocarbons such as benzene, toluene and xylene and halogenated aromatic hydrocarbons such as chlorobenzene is preferable. The polymerisation temperature is preferably in the range of 0 to 80° C., particularly 5 to 50° C. The pressure is not particularly restricted, and usually ranges from atmospheric pressure to 10 atmospheres.

According to the present invention, butadiene is cis-1,4-polymerised in the solution obtained in the above-mentioned step which contains trans-1,4-polybutadiene and the trans-1,4-polymerisation catalyst. As the cis-1,4-polymerisation catalyst, any of the catalysts (A), (B) and (C) specified hereinabove can be used. These cis-1,4-polymerisation catalysts should give cis-1,4-polybutadiene containing at least 90%, preferably at least 95%, of a cis-1,4 structure when polymerising butadiene in the solution.

The method of producing the material formed by electrochemically depositing on the powder of metallic zinc, used as one component of catalyst (A), and the properties of such material are described in detail in U.S. Pat. No. 3,423,387.

As the cobalt compound, for instance, halides, preferably chloride, of cobalt, salts of cobalt with carboxylic acids having 2 to 15 carbon atoms, and organic complex salts of cobalt can be used. Examples of cobalt carboxylates are cobalt octoate, naphthenate and benzoate which are soluble in an inert organic solvent. The organic complex salts of cobalt include chelate compounds of cobalt containing a β-diketone or β-ketonic acid ester as ligand, such as cobalt (II or III) acetylacetonate or acetoacetic acid ethylester complex salt.

The organo-aluminium compound used as one component of the catalyst (A) may be the same as those used to prepare the above-mentioned trans-1,4-polymerisation catalyst. If the organo-aluminium compound is an organo-aluminium compound having three organic radicals, it is used in combination with a Lewis acid such as aluminium trichloride and boron trifluoride, and when the organo-aluminium compound is a di- or sesqui-halide, it can be used together with a Lewis base such as pyridine, aniline and acrylonitrile.

The above-described cis-1,4-polymerisation catalyst is used in a catalytic amount. The amount of the catalyst to be used differs depending upon the kind and combination of catalyst components and the reaction conditions. When, for instance, a cobalt compound is used as one component of the catalyst (A), the catalyst is used in an amount such that the amount of the cobalt compound is at least 0.002 mmol, preferably at least 0.005 mmol and the amount of the organo-aluminium compound is at least 0.5 mmol, preferably at least 1 mmol, both per mol of the butadiene. When a material formed by electrochemically depositing metallic cobalt on the powder of metallic zinc is used as one component of the catalyst (A), the catalyst is used in an amount such that the amount of the cobalt component is 0.025 to 5 g. per 100 g. of butadiene and the amount of the organo-aluminium compound is 0.1 to 5 times the weight of the cobalt component. When the Lewis acid or base is used as a third component of the catalyst (A), the proportion of the third component to the organo-aluminium compound may be in the range mentioned with respect to the trans-1,4-polymerisation catalyst.

When the organo-aluminium compound in the catalyst (A) is identical with the organo-aluminium compound in the trans-1,4-polymerisation catalyst, the addition of the organo-aluminium compound in the cis-1,4-polymerisation step may be omitted. Even if the organo-aluminium compound is common between the trans-1,4-polymerisation catalyst and the catalyst (A), it is possible to attempt at the elevation of the cis-1,4-polymerisation activity by ageing the organo-aluminium compound and the cobalt component.

When the catalyst (B) is used as cis-1,4-polymerisation catalyst, metallic aluminium is used in an amount of 0.5 to 20 mols, and a Lewis acid such as aluminium trichloride is used in an amount of 0.1 to 13 mols, both per mol of the cobalt component. In addition, the obtained catalyst composition is used in an amount such that 0.05 to 10 g. of cobalt is contained per 100 g. of butadiene.

When the catalyst (C) is used as cis-1,4-polymerisation catalyst, 0.5 to 3 g. of mercuric chloride, 0.05 to 10 g.

of metallic cobalt, 0.05 to 0.3 g. of water and 10 to 30 mmols of diethylaluminium monochloride are used each based on 100 g. of butadiene.

The cis-1,4-polymerisation of butadiene in the invention is carried out in the presence of the above-described catalyst using the reaction system where the trans-1,4-polymerisation has been performed, so that it will give a final polybutadiene having a cis-1,4 structure of at least 70%, preferably at least 80%. The reaction temperature and pressure may be the same as those employed in the trans-1,4-polymerisation. The reaction time, although differing depending upon the kind and amount of the catalyst, is sufficiently 1 to 10 hours in general.

In the practice of the process of the invention, butadiene may be added wholly in a trans-1,4-polymerisation step, or it may be added in part in the trans-1,4-polymerisation step, the remainder being added in a cis-1,4-polymerisation step. The concentration of butadiene at this time is preferably 5 to 25% of the entire volume of the reaction system. The process of the invention is commercially practicable both by a batchwise operation wherein the trans-1,4-polymerisation and successively the cis-1,4-polymerisation are effected in the same reaction vessel and by a continuous operation wherein butadiene is continuously polymerised in a trans-1,4-polymerisation zone and a cis-1,4-polymerisation zone.

After the completion of the polymerisation reaction, polybutadiene is recovered in a known manner. For instance, at the end of the polymerisation reaction, a short stopper is put into the polymer solution to stop the polymerisation reaction, and a polymer is precipitated by adding a precipitating agent such as methanol and acetone or by flashing (evaporating the polymerisation solvent with or without blowing steam). The separated polymer is then dried and recovered. Thus, according to this invention, there can be obtained polybutadiene having an inherent viscosity of 1.7 to 5.0, particularly 2.0 to 3.5 and having a microstructure consisting of 3–30%, preferably 5–20%, of a trans-1,4 structure and at least 70%, preferably at least 80%, of a cis-1,4 structure.

The critical features of the process of the invention are that butadiene is trans-1,4-polymerised in the presence of a specific trans-1,4-polymerisation catalyst of an amount such as will provide the final polybutadiene having 3 to 30% of a trans-1,4 structure and subsequently butadiene is polymerised in the same polymerisation system by adding a specific cis-1,4-polymerisation catalyst; and that the so obtained polybutadiene contains the above-described microstructure and when made into a rubber product, has a markedly improved tear strength while substantially retaining the excellent properties of high cis-1,4-polybutadiene, such as excellent impact resilience and abrasion resistance.

The structure of the polybutadiene prepared in accordance with the process of the invention is not clear in detail. But from the results of the fractionation test in Reference Example 1 and the comparison of the physical properties of polybutadiene between Comparative Examples 1 and 2 and the examples, it is considered that the polybutadiene produced in accordance with the process of the invention contains a bonded polymer of trans-1,4-polybutadiene and cis-1,4-polybutadiene in addition to trans-1,4-polybutadiene and cis-1,4-polybutadiene. As shown in Reference Example 1, while a blend of trans-1,4-polybutadiene and cis-1,4-polybutadiene can be separated by fractionation test into trans-1,4-polybutadiene and cis-1,4-polybutadiene, the polybutadiene produced in accordance with the process of the invention cannot be clearly separated by the same fractionation test into trans-1,4-polybutadiene and cis-1,4-polybutadiene. Furthermore, comparison of the physical properties of a rubber product from a blend of trans-1,4-polybutadiene and cis-1,4-polybutadiene with those of a rubber product obtained from the polybutadiene obtained in the present invention clearly indicates that the rubber product from the polybutadiene obtained in the present invention is far more excellent in tear strength, elongation and tensile strength, although the contents of the trans-1,4 structure and the cis-1,4 structure are the same for both products.

When a superthin piece of the polybutadiene composition according to the invention which is dyed differentiatingly with osmic acid is observed with an electron microscope, it is seen that particles of trans-1,4-polybutadiene are finely and uniformly dispersed in a continuous phase of cis-1,4-polybutadiene and the cis-1,4-polybutadiene intrudes into the trans-1,4-polybutadiene particles. It is presumed that by dint of such a manner of bonding, the polybutadiene obtained in accordance with the process of the invention can give a rubber product having a very excellent tear strength. In view of this, it is of utmost importance in this invention that the poymerisation of butadiene be conducted with the trans-1,4-polymerisation time adjusted to the above-specified range and the content of the trans-1,4 structure of the final polymer maintained at 3 to 30%. On the other hand, if butadiene is polymerised by adding a trans-1,4-polymerisation catalyst and a cis-1,4-polymerisation catalyst simultaneously, polybutadiene which when made into a final rubber product has a satisfactory tear strength cannot be obtained. This will be shown in Comparative Examples 6 to 10.

The polybutadiene obtained in accordance with the process of the invention may be compounded with known compounding ingredients conventionally used in natural rubber or cis-1,4-polybutadiene, such as a vulcanizing agent, vulcanizing accelerator, reinforcing agent, filler, extender, antioxidant, and pigment. The compound may be kneaded, shaped and vulcanized in a manner known per se to make the desired rubber products.

Rubber produced from the polybutadiene obtained in accordance with the process of the invention particularly has a large tear strength, and therefore, can be made into tyre products which are difficult to undergo chipping. The polybutadiene according to the invention may be used as blend with natural rubber or other synthetic rubbers.

The invention will be described below by examples. In these examples, the microstructure of polybutadiene was determined by an infrared absorption spectrum analysing method described in R. Humpton, Analytical Chemistry, 21, 923 (1949). The tear strength was measured as to a test specimen of 10 mm. x 20 mm. x 0.5 mm. in size, which was notched by 10 mm. from the center of one 10-mm. long side in the longitudinal direction in straight line, in accordance with the method of simple extension tear test [Journal of Applied Polymer Science, 3, 168, (1960)].

The inherent viscosity $$[\eta]_{\text{toluene}}^{26°C.}$$

was calculated from the specific viscosity measured with an Ostwald's viscometer in toluene at 26° C.

EXAMPLE 1 AND COMPARATIVE EXAMPLES 1 TO 5

(i) A 500 cc. glass separable flask whose air had been replaced with a nitrogen gas was charged with a solution of 31 g. of 1,3-butadiene in 250 cc. of dehydrated benzene, followed by addition of a supernatant liquid obtained by mixing 0.75 mmol of vanadium trichloride, 0.88 mmol of pyridine and 10 cc. of benzene and ageing the mixture at 30° C. for 30 minutes, and also 1.2 g. of diethylaluminium monochloride. While stirring, the butadiene was polymerized at 30° C. After a lapse of 10 minutes from the addition of diethylaluminium monochloride, 0.02 mmol of cobalt (III) tris-acetylacetonate was added, and the polymerisation was continued for further 30 minutes under stirring while maintaining the temperature at 40° C. The obtained reaction mixture was put into 200 cc. of methanol containing 1% of β-naphthylamine to precipitate a rubbery polymer. The rubbery polymer was separated, washed with methanol, and dried at room temperature. 12.7 g. of polybutadiene (A) was obtained. Examination of its microstructure indicated that it has a cis-1,4 structure of 79.7%, a trans-1,4 structure of 19.3%, and a vinyl structure of 1.0%. The inherent viscosity $[\eta]_{toluene}^{26°C.}$ of polybutadiene (A) was 2.4.

(ii) The foregoing procedure was repeated except that the polymerisation time after the addition of cobalt (III) tris-acetylacetonate was changed to 60 minutes. There was obtained 21.2 g. of polybutadiene.

(B) Examination of its microstructure indicated that it has a cis-1,4 structure of 94.0%, a trans-1,4 structure of 4.8%, and a vinyl structure of 1.2%. The inherent viscosity $[\eta]_{toluene}^{26°C.}$ of polybutadiene (B) was 2.6.

(iii) Each of these polybutadienes (A) and (B) was compounded in accordance with the following recipes A and B, and each of the compounds was vulcanized for 40 minutes at 160° C. (for recipe A) and at 140° C. (for recipe B).

Recipe A:                                                       Part
  Polybutadiene _____ 100
  Zinc oxide _____ 2
  Stearic acid _____ 0.5
  Vulcanization accelerator CZ cyclohexyl-benzo-
    thiazyl sulfenamide) _____ 1
  Vulcanization accelerator TT (tetramethylthi-
    uram disulfide) _____ 0.3
  Sulfur _____ 2
  Anti-oxidant (phenyl-β-naphthylamine) _____ 1
Recipe B:                                                       Part
  Polybutadiene _____ 100
  Zinc oxide _____ 5
  Stearic acid _____ 3
  Vulcanization accelerator NOBS (N-oxydiethyl-
    ene-2-benzothiazole sulfenamide) _____ 1.0
  Vulcanization accelerator DPG (diphenyl gua-
    nidine) _____ 0.15
  Sulfur _____ 1.5
  Anti-oxidant (phenyl-β-naphthylamine) _____ 1
  HAF carbon _____ 50
  Oil (Esso B-1, naphthenic process oil) _____ 8

The tear strength, tensile strength and elongation of the vulcanization products are shown in Table 1 below.

(iv) For the sake of comparison, a blend of 80 parts of cis-1,4-polybutadiene and 20 parts of trans-1,4-polybutadiene (Comparative Example 1), a blend of 94 parts of cis-1,4-polybutadiene and 6 parts of trans-1,4-polybutadiene (Comparative Example 2), high cis-1,4-polybutadiene (Comparative Example 3), low cis-1,4-polybutadiene (Comparative Example 4), and natural rubber (Comparative Example 5) were each compounded in accordance the recipes A and B given above, and each of the compounds was vulcanized for 40 minutes at 160° C. (for recipe A) and at 140° C. (for recipe B). The properties of the vulcanization products are shown in Table 1.

TABLE 1

|  | $[\eta]_{toluene}^{26°C.}$ | Recipe (A) | | | Recipe (B) | | |
| --- | --- | --- | --- | --- | --- | --- | --- |
|  |  | Tear strength (kg./cm.) | Tensile strength (kg./cm.²) | Elongation (percent) | Tear strength (kg./cm.) | Tensile strength (kg./cm.²) | Elongation (percent) |
| Polybutadiene A | 2.4 | 4.6 | 59.0 | 480 | 45.0 | 195 | 490 |
| Polybutadiene B | 2.6 | 3.7 | 23.0 | 367 | 37.0 | 190 | 463 |
| Comparative Example 1 | 2.0 | 1.4 | 17.8 | 158 | 12.0 | 157 | 353 |
| Comparative Example 2 | 2.1 | 0.7 | 14.0 | 90 | 11.2 | 170 | 390 |
| Comparative Example 3 | 2.2 | 0.4 | 10.9 | 84 | 10.1 | 180 | 400 |
| Comparative Example 4 | 2.2 | 0.6 | 13.4 | 117 | 9.6 | 170 | 380 |
| Comparative Example 5 |  | 6.7 | 164.3 | 902 | 22.4 | 200 | 648 |

The cis-1,4-polybutadiene employed in Comparative Example 1, 2 and 3 is cis-1,4-polybutadiene having a cis-1,4 structure of 98%, a trans-1,4- structure of 1% and a vinyl structure of 1% obtained by polymerising 1,3-butadiene with the use of cobalt octoate and diethylaluminium monochloride as catalyst. The trans-1,4-polybutadiene used in Comparative Examples 1 and 2 is trans-1,4-polybutadiene having a trans-1,4 structure of 99.8% obtained with a catalyst system consisting of vanadium trichloride, pyridine and diethylaluminium monochloride. The blend of cis-1,4- and trans-1,4-polybutadienes used in Comparative Examples 1 and 2 was prepared by dissolving both polybutadienes into benzene to mix them and putting the polybutadiene solution into a great quantity of methanol to precipitate the polybutadienes. The low cis-1,4-polybutadiene used in Comparative Example 4 is a polybutadiene having a cis-1,4 structure of 38.8%, a trans-1,4-structure of 48.6% and a vinyl structure of 12.6% obtained with the use of a lithium-containing catalyst.

It is seen from Table 1 that rubbers from the polybutadienes (A) and (B) produced in accordance with the process of the invention have far more excellent tear strength, tensile strength and elongation than rubbers from the other polybutadienes, showing values near those of natural rubber. Thus, it is clear that the polybutadienes obtained in accordance with the process of the invention have a remarkably improved tear strength, especially in the case of compounding carbon, as compared with rubbers from the conventional high cis-1,4-polybutadiene.

EXAMPLES 2 to 25

The procedure of Example 1 was repeated except that the trans-1,4-polymerisation catalysts, cis-1,4-polymerisation catalysts and polymerisation conditions indicated in Table 2 were employed.

Each of the obtained polybutadienes was compounded with other substances in accordance with the recipes A and B, and each of the compounds was vulcanized under the same vulcanization conditions as in Example 1.

The operational conditions, the inherent viscosity and microstructure of the obtained polybutadienes and the properties of the resulting vulcanized products are shown in Table 2.

The trans-1,4-polymerisation catalysts given in Table 2 are as follows:

A: 0.028 m-mol of vanadium (III) tris-acetylacetonate and 10 m-mols of diethylaluminium monochloride.

B: 0.020 m-mol of vanadium (III) tris-acetylacetonate and 10 m-mols of diethylaluminium monochloride.

C: 0.028 m-mol of vanadium (III) tris-acetylacetonate and 10 m-mols of diethylaluminium monochloride.

D: 0.14 m-mol of vanadium (III) tris-acetylacetonate and 10 m-mols of diethylaluminium monochloride.

E: 0.028 m-mol of vanadium (III) tris-acetylacetonate and 10 m-mols of diethylaluminium monochloride.

F: 0.05 m-mol of vanadium (III) tris-acetylacetonate, 10 m-mols of triethylaluminium and 20 m-mols of aluminium trichloride, all dissolved in 10 ml. of benzene and aged for 30 minutes at 30° C.

G: 0.028 m-mol of vanadium (III) tris-acetylacetonate and 10 m-mols of aluminium sesquichloride.

H: 0.05 m-mol of vanadyl bis-acetylacetonate and 10 m-mols of diethylaluminium monochloride.

I: 0.05 m-mol of vanadyl bis-acetylacetonate, 10 m-mols of triethylaluminium, 20 m-mols of aluminium trichloride and 10 ml. of benzene, which were aged at 30° C. for 60 minutes.

J: 0.028 m-mol, calculated as V, of vanadium naphthenate and 10 m-mols of diethylaluminium monochloride.

K: 0.75 m-mol of vanadium trichloride and 0.88 m-mol of pyridine were aged at 30° C. for 30 minutes on addition of 10 ml. of benzene. The obtained supernatant liquid and 10 m-mols of diethylaluminium monochloride were used.

L: 0.75 m-mol of vanadium trichloride and 0.88 m-mol of pyridine were aged at 30° C. for 30 minutes on addition of 10 ml. of benzene. The obtained supernatant liquid and 10 m-mols of diethylaluminium monochloride were used.

M: 0.03 m-mol of vanadium oxytrichloride and 10 m-mols of diethylaluminium monochloride.

The cis-1,4-polymerisation catalysts given in Table 2 are as follows:

A': 0.028 m-mol of cobalt octoate.

B': 0.028 m-mol of cobalt (III) tris-acetylacetonate.

C': 1 g. of a material (containing 18% by weight of cobalt) formed by electrochemically depositing metallic cobalt on the powder of metallic zinc.

D': 1 g. of mercuric chloride, 0.1 g. of metallic cobalt, 0.15 g. of water, 10 ml. of benzene, and 16.6 m-mols of diethyl aluminium, aged at 30° C. for 10 minutes.

E': 5 ml. of the supernatant liquid resulting from the ageing at 80° C. for 180 minutes of 100 ml. of monochlorobenzene, 2 g. of metallic aluminium powder, 7 g. of phosphorus pentachloride, and 4 g. of cobalt chloride (containing 8% by weight of water).

F': 0.03 m-mol of cobalt octoate and 10 m-mols of diethylaluminium monochloride.

G': 0.03 m-mol of cobalt octoate and 4 m-mols of pyridine.

H': 0.03 m-mol of cobalt octoate.

I': 0.03 m-mol of cobalt (III) tris-acetylacetonate.

J': 0.05 g. of metallic cobalt, 6.3 m-mols of pyridine, and 12 m-mols of ethylaluminium dichloride, and 10 ml. of benzene, which are aged at 30° C. for 60 minutes.

K': 0.05 m-mol of cobalt octoate, 4 m-mols of pyridine and 10 m-mols of ethylaluminium sesquichloride.

L': A liquid obtained by aging 0.05 g. of metallic cobalt, 6.3 m-mols of pyridine, 12 m-mols of ethylaluminium dichloride and 10 ml. of benzene at 30° C. for 60 minutes.

COMPARATIVE EXAMPLES 6 TO 10

The procedure of Example 1 was repeated except that the trans-1,4-polymerisation catalysts and the cis-1,4-polymerisation catalysts indicated in Table 3 were simultaneously added to the reaction system, and the polymerisation conditions indicated in Table 3 were employed. The operational conditions and the obtained results are shown in Table 3.

It is seen from Table 3 that when butadiene is polymerised under the conditions of the present invention except that the trans-1,4-polymerisation catalyst and the cis-1,4-polymerisation catalyst are simultaneously added to the reaction system, powdery polybutadiene is obtained in many cases, which is difficult to make into a rubber product. It is also appreciated that when the cis-1,4-polymerisation catalyst is used in an amount more than that of the trans-1,4-polymerisation catalyst, a rubbery polybutadiene is obtained, but that vulcanized products obtained from this polybutadiene in accordance with the same recipes A and B in the same manner as in Example 1 do not have an improved tear strength unlike the polybutadienes according to the invention.

TABLE 3

| Comparative Example Number | 6 | 7 | 8 | 9 | 10 |
|---|---|---|---|---|---|
| Amount of butadiene used (g.) | [1]90 | [2]31 | [2]31 | [2]31 | [2]31 |
| Trans-1,4-polymerisation catalyst | A | B | C | D | E |
| Cis-1,4-polymerisation catalyst | A' | B' | C' | D' | E' |
| V/Co molar ratio | 0.29 | 1 | 1.7 | 37 | 0.29 |
| Polymerisation temperature (° C.) | 30 | 40 | 40 | 40 | 40 |
| Polymerisation time (min.) | 60 | 60 | 60 | 60 | 60 |
| Amount of polybutadiene obtained (g.) | 46.0 | [3]4.2 | 4.9 | 4.7 | 23.0 |
| Inherent viscosity [$\eta$] 26° C. toluene | 3.8 | | | | |
| Microstructure: | | | | | |
| Trans-1,4 (percent) | 9.4 | 45.2 | 50.9 | 65.0 | 9.1 |
| Vinyl (percent) | 1.0 | 0.6 | 0.5 | 3.0 | 24.1 |
| Cis-1,4 (percent) | 89.6 | 54.2 | 48.6 | 32.0 | 66.8 |
| Properties of vulcanized product (compound of recipe A): | | | | | |
| Tear strength (kg./cm.) | 1.5 | | | | |
| Tensile strength (kg./cm.[2]) | 18.2 | | | | |
| Elongation (percent) | 285 | | | | |
| Properties of vulcanized product (compound of recipe B): | | | | | |
| Tear strength (kg./cm.) | 12 | | | | |
| Tensile strength (kg./cm.[2]) | 227 | | | | |
| Elongation (percent) | 433 | | | | |

[1] Dissolved in 100 ml. benzene.
[2] Dissolved in 250 ml. benzene.
[3] Powdery.

REFERENCE EXAMPLE 1

The fractionation test and the measurements of crystallinity and melting point were conducted with respect to (i) polybutadiene (B) obtained in Example 1,
(ii) a blend of 6 parts of high trans-1,4-polybutadiene and 94 parts of high cis-1,4-polybutadiene used in Example 2, and,
(iii) the polybutadiene obtained in Comparative Example 6 using the trans-1,4-polymerisation catalyst and the cis-1,4-polymerisation catalyst simultaneously.

METHOD OF FRACTIONATION TEST

Five (5) grams of the sample polybutadiene was dissolved into 250 cc. of toluene at 60-70° C., and the solution was cooled to approximately —20° C. to cause a partial precipitation of the polybutadiene. The so obtained slurry was subjected to a centrifugal separation at 0-10° C. to separate it into a precipitate portion and a solution portion. The precipitate portion was further subjected to the same separation procedure with the use of 100 cc. of toluene to separate it into a precipitate portion and a solution portion. The precipitate portion was dried to get polybutadiene. The solution portions separated in these two separating operations were combined, and added to a great quantity of methanol to precipitate polybutadiene which was then dried. The microstructure of polybutadiene with respect to the precipitate and solution portions was determined.

The melting point was measured with a Difference Scanning Calorimeter, and the crystallinity was measured by an X-ray diffraction analysis.

The results are shown in Table 4.

TABLE 4

| | Microstructure | | | | | | | | | |
|---|---|---|---|---|---|---|---|---|---|---|
| | Cis-1,4 structure (percent) | | Trans-1,4 structure (percent) | | Vinyl structure (percent) | | Melting point (° C.) | | Crystallinity (percent) | |
| | Precipitate portion | Solution portion | Precipitate portion | Solution portion | Precipitate portion | Solution portion | Whole polymer | Precipitate portion | Whole polymer | Precipitate portion |
| Polybutadiene (B), obtained in Example 1 | 16.0 | 97.4 | 83.5 | 1.4 | 0.5 | 1.2 | 131.5 | 135.0 | 2.0 | 53.9 |
| Polybutadiene obtained in Comparative Example 2 | 0.1 | 97.8 | 99.5 | 1.0 | 0.4 | 1.2 | 133.0 | 138.0 | 4.1 | 71.0 |
| Polybutadiene obtained in Comparative Example 6 | 12.6 | 96.2 | 87.3 | 3.2 | 0.1 | 0.6 | 125.0 | 131.0 | 2.7 | 49.7 |

The trans-1,4-polymerisation catalysts given in Table 3 are as follows:

A: 0.086 m-mol of vanadium (III) tris-acetylacetonate and 20 m-mols of ethylaluminium sesquichloride.

B: 0.028 m-mol of vanadium (III) tris-acetylacetonate and 10 m-mols of diethylaluminium monochloride.

C: 0.05 m-mol of vanadyl bis-acetylacetonate and 10 m-mols of diethylaluminium monochloride.

D: the aged product (at 30° C. for 30 minutes) of 0.75 m-mol of vanadium trichloride, 0.88 m-mol of pyridine and 10 ml. of benzene, and 10 m-mols of diethylaluminium monochloride.

E: 0.75 m-mol of vanadium trichloride and 10 m-mols of diethylaluminium monochloride.

The cis-1,4-polymerisation catalysts given in Table 3 are as follows:

A': 0.30 m-mol of cobalt (III) tris-acetylacetonate.
B': 0.028 m-mol of cobalt (III) tris-acetylacetonate.
C': 0.03 m-mol of cobalt octoate.
D': 0.02 m-mol of cobalt (III) tris-acetylacetonate.
E': 2.62 m-mols of cobalt (III) tris-acetylacetonate.

These results of measurements indicate the following.

(1) The trans-1,4 structure is clearly separated from the cis-1,4 structure in the blend of Comparative Example 2. But in the polybutadiene of the present invention, there is a considerable amount of the cis-1,4 structure even in the precipitate portion. This seems to show that the trans-1,4-polybutadiene is at least partly bonded with the cis-1,4-polybutadiene in the polybutadiene of the present invention.

(2) The polybutadiene of the present invention has a higher crystallinity and melting point in its precipitate portion than the polybutadiene of Comparative Example 6 which was prepared by the simultaneous use of the trans-1,4- and cis-1,4-polymerisation catalysts.

It is presumed that an excellent tear strength of the polybutadiene of the present invention as compared with the polybutadienes of Comparative Examples 2 and 6 is attributable to the differences mentioned in (1) and (2) above.

REFERENCE EXAMPLE 2

This example is given to illustrate that the polybutadiene according to the present invention substantially retains the excellent properties of high cis-1,4-polybutadiene.

Each of the polybutadiene (B) obtained in Example 1 and the high cis-1,4-polybutadiene used in Comparative Example 3 was compounded with other substances in accordance with the recipe B given in Example 1. Each of the obtained compounds was vulcanized under the same conditions as given in Example 1. These vulcanized products were subjected to a heat-generating test and an abrasion test.

The heat-generating test was conducted in accordance with ASTM D623–58 on a Goodrich Flexometer, and heat generated after a lapse of 30 minutes at $$\Delta T°\ C.=100°\ C.$$

was measured. The abrasion test was conducted using an Akron Abrasion tester, with a load of 6 pounds, an angle of 15°, and the number of rotation of an abrasive stone of 33 r.p.m., and an abrasion loss was expressed in cc./1000 cycles. The results are shown in Table 5.

TABLE 5

| | Heat generated (° C.) | Abrasion loss (cc./1,000 cycles) |
|---|---|---|
| Polybutadiene (B) | 20 | 0.005 |
| Polybutadiene of comparative Example 3 | 19 | 0.01 |

It is clear from the results given in Table 5 and those of Example 1 that the polybutadiene according to the present invention is not inferior to high cis-1,4-polybutadiene in heat build-up and abrasion resistance, and has a remarkably improved tear strength.

We claim:

1. A process for producing a polybutadiene composition having improved tear strength, which comprises polymerizing butadiene in an inert organic solvent for 5 minutes to 1 hour at a temperature of 0° to 80° C. in the presence of a trans-1,4-polymerization catalyst of an amount such that the final polybutadiene contains 3–20% of a trans-1,4-structure, said catalyst consisting of (a) a vanadium compound selected from the group consisting of halides, oxyhalides, organic complex salts and organic acid salts of vanadium; and
   (b) a member selected from the group consisting of
      (i) compounds expressed by the general formula $$AlR_nX_{3-n}$$

wherein R is an alkyl group or phenyl group, X is a halogen atom, and $n$ is 2 or 1.5,
      (ii) combinations of a Lewis acid selected from the group consisting of aluminum trichloride and boron trifluoride and compounds expressed by the general formula $$AlR_3$$

wherein R is an alkyl group or phenyl group, and
      (iii) combination of a Lewis base selected from the group consisting of pyridine, aniline and acrylonitrile and compounds expressed by the general formula $$AlRX_2$$

wherein R is an alkyl group or phenyl group, and X is a halogen atom, whereby a trans-1,4-polybutadiene having at least 96% of a trans-1,4-structure is produced in an amount of 3–20% based on the final product, thereafter polymerizing butadiene further in the same polymerization system at a temperature of 0° to 80° C. in the presence of a cis-1,4-polymerization catalyst, said catalyst being selected from the group consisting of (A) a catalyst consisting of
      (a') metallic cobalt, a material formed by electrochemically depositing metallic cobalt on the powder of metallic zinc, or a cobalt compound, and
      (b')(i) a compound expressed by the general formula $$AlR_nX_{3-n}$$

wherein R is an alkyl group or phenyl group, X is a halogen atom, and $n$ is 2 or 1.5,
      (ii) a combination of a Lewis acid selected from the group consisting of aluminum trichloride and boron trifluoride and a compound expressed by the general formula $$AlR_3$$

wherein R is an alkyl group or phenyl group, or
      (iii) a combination of a Lewis base selected from the group consisting of pyridine, aniline and acrylonitrile and a compound expressed by the general formula $$AlR_mX_{3-m}$$

wherein R is an alkyl group or phenyl group, X is a halogen atom, and $m$ is 1 or 1.5,
   (B) a catalyst obtained from a cobalt halide, metallic aluminum and a Lewis acid selected from the group consisting of aluminum trichloride and boron trifluoride, and
   (C) a catalyst obtained from metallic cobalt, mercuric chloride, water and a dialkyl aluminum monochloride, thereby forming a polybutadiene composition containing 3–20% of a trans-1,4-structure and at least 80% of a cis-1,4-structure and having an inherent viscosity of 1.7–5.0, and then recovering said polybutadiene composition.

2. The process according to claim 1 wherein the amount of the vanadium compound and the organoaluminium compound of the trans-1,4-polymerization catalyst are at least 0.5 m-mol respectively per mol of butadiene, and the Al/V molar ratio is in the range of 1 to 600.

3. The process according to claim 1 wherein the cobalt compound of the cis-1,4-polymerization catalyst (A) is selected from halides of cobalt, cobalt salts of carboxylic acids having 2 to 5 carbon atoms, and organic complex salts of cobalt.

4. The process according to claim 1 wherein the cis-1,4-polymerization catalyst is catalyst A, and at least 0.02 m-mol of the cobalt compound and at least 0.5 m-mol of the organoaluminium compound are present per mol of butadiene.

5. The process according to claim 1 wherein the cis-1,4-polymerisation catalyst is catalyst (A), metallic cobalt or a material formed by electrochemically depositing metallic cobalt on the powder of metallic zinc is present in an amount of 0.025 to 5 g. per 100 g. of butadiene, and the organoaluminium compound is present in an amount 0.1 to 5 times the weight of said cobalt component.

6. The process according to claim 1 wherein a cis-1,4-polymerisation catalyst composition (B) containing 0.5–20 mols of metallic aluminium and 0.1–13 mols of a Lewis acid, both per mol of cobalt halide, is present in such a ratio that 0.05–10 g. of cobalt is contained per 100 g. of butadiene.

7. The process according to claim 1 wherein the cis-1,4-polymerisation catalyst is catalyst (C), and 0.5–3 g. of mercuric chloride, 0.05–10 g. of metallic cobalt, 0.05–0.3 g. of water and 10–30 m-mols of diethyl aluminium monochloride are present per 100 g. of butadiene.

8. A process for the preparation of polybutadiene, which comprises polymerizing butadiene for 5 minutes to 1 hour in an inert organic solvent in the presence of a trans-1,4-polymerization catalyst of an amount such that the final polybutadiene has a trans-1,4-structure of 3 to 30%, said catalyst being a combination catalyst consisting of
- (a) a vanadium compound selected from the group consisting of halides, oxyhalides, organic complex salts and organic acid salts of vanadium; and
- (b) a member selected from the group consisting of
  - (i) compounds expressed by the general formula $$AlR_nX_{3-n}$$

wherein R is an alkyl group or phenyl group, X is a halogen atom, and $n$ is 2 or 1.5,
  - (ii) combinations of a Lewis acid selected from the group consisting of aluminum trichloride and boron trifluoride and compounds expressed by the general formula $$AlR_3$$

wherein R is an alkyl group or phenyl group, and
  - (iii) combinations of a Lewis base selected from the group consisting of pyridine, aniline and acrylonitrile and compounds expressed by the general formula $$AlRX_2$$

wherein R is an alkyl group or phenyl group, and X is a halogen atom, adding metallic cobalt, a cobalt compound or a material formed by electrochemically depositing metallic cobalt on the powder of metallic zinc to this polymerization system and polymerizing butadiene further in this system, and thereafter recovering polybutadiene having a trans-1,4-structure of 3 to 30% and a cis-1,4-structure of at least 70%.

References Cited

UNITED STATES PATENTS

| | | | |
|---|---|---|---|
| 3,230,209 | 1/1966 | Cesare et al. | 260—94.3 |
| 3,423,387 | 1/1969 | Sugiura et al. | 260—94.3 |
| 3,476,830 | 11/1969 | Naarmann et al. | 260—879 |
| 3,489,823 | 1/1970 | Naarmann et al. | 260—879 |

JOSEPH L. SCHOFER, Primary Examiner

R. A. GAITHER, Assistant Examiner

U.S. Cl. X.R.

260—879